US008009556B2

(12) United States Patent
May (10) Patent No.: US 8,009,556 B2
(45) Date of Patent: Aug. 30, 2011

(54) SYSTEM AND METHOD FOR PROVIDING REDUNDANT ROUTING CAPABILITIES FOR A NETWORK NODE

(75) Inventor: Robert Alvin May, Vancouver (CA)

(73) Assignee: IP Infusion, Inc., San Jose, CA (US)

( * ) Notice: Subject to any disclaimer, the term of this patent is extended or adjusted under 35 U.S.C. 154(b) by 1300 days.

(21) Appl. No.: 10/687,955

(22) Filed: Oct. 17, 2003

(65) Prior Publication Data
US 2005/0083953 A1  Apr. 21, 2005

(51) Int. Cl.
H04J 1/16 (2006.01)
(52) U.S. Cl. ......... 370/219; 370/216; 370/238; 370/242
(58) Field of Classification Search .......... 370/351, 370/229, 216, 401, 219, 238, 242; 709/238, 709/248; 714/3, 11, 23
See application file for complete search history.

(56) References Cited

U.S. PATENT DOCUMENTS

| 6,078,957 | A | 6/2000 | Adelman et al. |
| 6,148,410 | A * | 11/2000 | Baskey et al. ................ 714/4 |
| 6,190,148 | B1 * | 2/2001 | Ni .............................. 418/55.6 |
| 6,876,625 | B1 | 4/2005 | McAllister et al. |
| 6,910,148 | B1 * | 6/2005 | Ho et al. ......................... 714/4 |
| 6,928,589 | B1 | 8/2005 | Pomaranski et al. |
| 6,938,078 | B1 | 8/2005 | Yamada |
| 6,944,785 | B2 | 9/2005 | Gadir et al. |
| 6,983,294 | B2 * | 1/2006 | Jones et al. .................... 707/202 |
| 7,126,921 | B2 | 10/2006 | Mark et al. |
| 7,130,304 | B1 | 10/2006 | Aggarwal |
| 7,181,567 | B2 | 2/2007 | Krishnan |
| 7,236,453 | B2 | 6/2007 | Visser et al. .................. 370/219 |
| 7,292,535 | B2 | 11/2007 | Folkes et al. |
| 7,317,731 | B2 | 1/2008 | Seddigh et al. |
| 7,359,377 | B1 | 4/2008 | Kompella et al. |
| 7,490,161 | B2 * | 2/2009 | Ren .............................. 709/238 |
| 2002/0049859 | A1 * | 4/2002 | Bruckert et al. ............ 709/246 |
| 2002/0169794 | A1 * | 11/2002 | Jones et al. .................... 707/204 |
| 2002/0176355 | A1 * | 11/2002 | Mimms et al. ................ 370/216 |
| 2002/0191547 | A1 | 12/2002 | Akyol et al. |

(Continued)

FOREIGN PATENT DOCUMENTS

EP          1331772 A1 * 7/2003

(Continued)

OTHER PUBLICATIONS

J. Moy "Hitless OSPF Restart" Network Working Group Feb. 2002 http://www.ietf.org/proceedings/02jul/I-D/draft-ietf-ospf-hitless-restart-02.txt.*

(Continued)

Primary Examiner — Albert Decady
Assistant Examiner — Darrin Dunn
(74) Attorney, Agent, or Firm — Nixon Peabody LLP (57) ABSTRACT

A routing device that provides redundancy for a node is envisioned. The routing device has a dynamic routing module operable to start functioning at a particular time. A configuration manager is provided. The configuration manager is coupled to a second routing device and stores configuration information associated with operational characteristics of a dynamic routing module associated with the second routing device. A network information module stores routing information from the second routing device. The dynamic routing module is executed upon an indication that the second dynamic routing device is no longer operating, and the configuration device configures the dynamic routing module according to the stored configuration information.

3 Claims, 11 Drawing Sheets

U.S. PATENT DOCUMENTS

| | | | |
|---|---|---|---|
| 2003/0056138 A1 | 3/2003 | Ren | |
| 2003/0140155 A1 | 7/2003 | Harvey et al. | 709/230 |
| 2003/0140156 A1 | 7/2003 | Karim | |
| 2003/0140167 A1* | 7/2003 | Harvey et al. | 709/238 |
| 2003/0154431 A1* | 8/2003 | Lin et al. | 714/48 |
| 2003/0198182 A1* | 10/2003 | Pegrum et al. | 370/225 |
| 2003/0218982 A1* | 11/2003 | Folkes et al. | 370/238 |
| 2004/0001485 A1 | 1/2004 | Frick et al. | 370/389 |
| 2004/0008700 A1* | 1/2004 | Visser et al. | 370/401 |
| 2004/0049859 A1 | 3/2004 | Lang et al. | |
| 2004/0059830 A1 | 3/2004 | Brown | |
| 2004/0090913 A1* | 5/2004 | Scudder et al. | 370/219 |
| 2004/0098490 A1* | 5/2004 | Dinker et al. | 709/229 |
| 2004/0260825 A1* | 12/2004 | Agarwal et al. | 709/230 |
| 2005/0050136 A1 | 3/2005 | Golla | |
| 2005/0265346 A1* | 12/2005 | Ho et al. | 370/392 |
| 2006/0053231 A1* | 3/2006 | Lange et al. | 709/239 |

FOREIGN PATENT DOCUMENTS

| | | |
|---|---|---|
| JP | 2002135328 A | 5/2002 |

OTHER PUBLICATIONS

Office Action in U.S. Appl. No. 10/966,367, mailed Apr. 6, 2010.
Office Action for U.S. Appl. No. 10/966,367, mailed Sep. 19, 2007.
Office Action for U.S. Appl. No. 10/966,367, mailed Mar. 24, 2008.
Office Action for U.S. Appl. No. 10/966,367, mailed Sep. 26, 2008.
Office Action for U.S. Appl. No. 10/966,367, mailed Dec. 8, 2009.
Sangli, Srihari R., et al., "Graceful Restart Mechanism for BGP", *IETF, Network Working Group*, Chapter 3, 6, (Jul. 31, 2003), Retrieved from the Internet: URL: http://www.ietf.org/proceedings/03mar/I-D/draft-ietf-idr-restart-06.txt>.
International Search Report dated Jan. 27, 2005, PCT/US2004/034255.
Moy, J., "Hitless OSPF Restart," Network Working Group, Aug. 2001, pp. 1-13.
Notice of Allowance in U.S. Appl. No. 10/966,367, mailed Oct. 15, 2010.

* cited by examiner

SYSTEM AND METHOD FOR PROVIDING REDUNDANT ROUTING CAPABILITIES FOR A NETWORK NODE

BACKGROUND

1. Field of the Invention

The present invention is directed to networking technology. In particular, the invention is directed to providing a backup service to a group of computing devices located within a logical space.

2. Background

Dynamic routing occurs when routing devices talk to adjacent routing devices, informing each other of what network each routing device is currently connected to. The routing devices must communicate using a routing protocol that is running by an application instantiating the routing function, or a routing daemon. In contrast to a static protocol, the information placed into the routing tables—the routes—are added and deleted dynamically by the routing daemon as the routes messages take in the system change over time. Additionally, other changes can occur to the routing information over time. For example, route preferences can change due to changes in network conditions such as delays, route addition/deletions, and network reachability issues.

The routing daemon adds a routing policy to the system, thus choosing which routes to insert into a routing table maintained by the system. In the case of multiple routes to the same destination, the daemon chooses which route is the best to use under the circumstances. On the other hand, if a link goes down, the daemon can then delete any routes connected to that link. The daemon can find alternative routes if need be.

Thus, a change in a network topology typically impacts the performance of the system. First, when a link goes down, the other routing devices must determine that the link has ceased to operate. Next, the other routing devices in the system typically search for new routes that do not use the link that has been determined to be down. This possibly entails a rebuild of the internal routing tables for neighboring routing devices to the link. In addition to link failures, changes may also be precipitated by such events as node failures, or network failures.

Next, when the link again becomes operational, the routing daemon on neighboring routing devices may need to place the route information back into the tables that they maintain. Again, this may entail effort in the form of determining metrics for routes associated with the again-operational link as well as rebuilding any internal routing tables at the neighboring nodes or routing devices upon the reinstantiation of service of the routing device at a node that the routing device services.

Open Shortest Path First (OSPF) is a link-state protocol that implements dynamic routing on routing devices. In a link-state protocol, each routing device actively tests the status of its link to each of its neighbors, and sends this information to its other neighbors. This process is repeated for all the routing devices for nodes in the network.

Each routing device takes this link-state information and builds a complete routing table. This method can be used to quickly implement a dynamic routing system, especially in case of changes in the links in the network.

Such a routing system can also perform other functions relating to the network. These features can include calculating separate sets of routes for each type of service, load balancing between equal-cost routes to a destination, and/or calculation of routing metrics based on a cost. This cost can be based on throughput, round trip time, reliability, or other factors. In this manner a separate cost can be assigned for each type of service.

The dynamic routing devices using such mechanisms as link state protocols, like OSPF, can be used to produce a more stable network by using the routing devices to act on network changes in predictable and time effective manner. Typically, the routing device can collect and advertise information about its neighboring routing devices. The routing device calculates and sorts its neighbors, finding all the reachable routing devices and the preferred path to those other routing devices.

Each routing device contains a routing mechanism that controls the forwarding process. Typically, the information is stored in a routing database. This database contains information about interfaces at the routing device that are operable, as well as status information about each neighbor to a routing device. This database is the same for all participating routing devices, and is promulgated by messages to the other routing devices. The routing mechanism may be implemented in software, hardware, or any combination thereof running on the routing device.

The information contained in the routing database focuses on the topology of the networks as a directed graph. Routing devices and networks can form the vertices of such a graph. Periodically, the information is broadcast (flooded) to all the routing devices in the system. An OSPF routing device also computes the shortest path to all the other routing devices in the system regarding itself as the working node (or the root node).

In some typical systems, when the routing device that is a gateway to a number of other devices fails, a backup routing device is then brought online. However, in this case, the failure of the first device to respond to network traffic and/or routing configuration requests may cause the other routing devices in the network to determine that the routing device associated with a node that is no longer reachable.

Typically, upon an indication of a cessation of operation of a routing device associated with a node, the dynamic process of regaining contact to the lost portions of the network may be initiated by the other routing devices that are coupled to the now nonfunctioning routing device. If a backup routing device responds, the neighboring routing devices in the system may have to recompute the values of the connection to the backup routing device now servicing the node. Based upon the new values available to the neighboring routing device, these neighboring routing devices may have to recalculate routing costs and rebuild their internal routing tables.

Upon rebuilding the internal databases, these neighboring routing devices may then distribute the entries associated with the backup routing device to the other routing devices in the interconnected network. Further, upon receipt of the new values associated with the "new" connection to the now functioning backup routing device, the other routing devices in the defined network may then also have to recalculate routing costs and rebuild their routing tables.

During steady-state operations, the routing devices simply exchange update messages, like OSPF Hello messages. These messages are typically small datagrams that advertise only that a particular routing device is still up and running. During synchronization operations, however, a variety of complex messages can be exchanged, depending on the event that occurred, the state of the database, and other factors.

If an interface changes state, only a small amount of database activity is required to fully integrate the information into the area databases on all the routing devices within that area. If a new routing device is brought online, however, that routing device will have to discover all the routing devices, networks and interfaces within its area, and this process can consume a significant amount of network resources.

On broadcast and multi-access networks, many dynamic routing mechanisms support the use of a designated routing device. This lets new routing devices obtain complete copies of the database with minimal network impact. On point-to-point networks, however, each routing device has to obtain data from each of the other routing devices independently. This database-synchronization model represents what is perhaps the greatest challenge with running dynamic routing mechanisms in large, complex networks, since a significant amount of time can be spent maintaining database synchronization in the face of network stability problems.

BRIEF DESCRIPTION OF THE INVENTION

A routing device that provides redundancy for a node is envisioned. The routing device has a dynamic routing module operable to start functioning at a particular time. A configuration manager is provided. The configuration manager is coupled to a second routing device and stores configuration information associated with operational characteristics of a dynamic routing module associated with the second routing device. A network information module stores routing information from the second routing device. The dynamic routing module is executed upon an indication that the second dynamic routing device is no longer operating, and the configuration device configures the dynamic routing module according to the stored configuration information.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF THE INVENTION

Embodiments of the present invention are described herein in the context of a system and method for providing redundant routing capabilities for a network node. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Further, the routing devices may be implemented using any of the above, general purpose processors, or application specific network processors.

Figure 1:
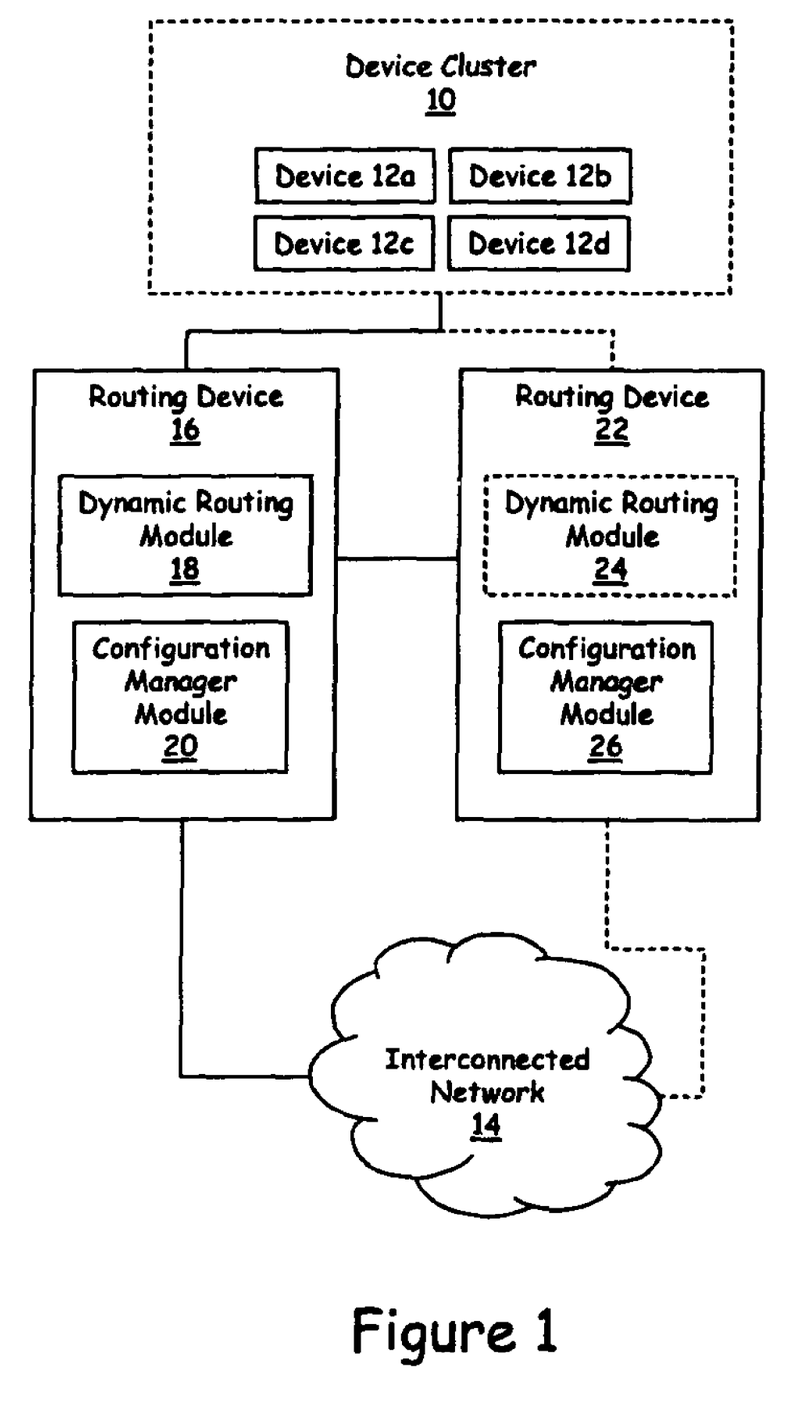
FIG. 1 is a schematic diagram of a network having a cluster of devices serviced with a routing device and a backup routing device, according to the invention.

FIG. 1 is a schematic diagram of a network having a cluster of devices serviced with a routing device and a backup, according to the invention. A cluster 10 contains several network enabled devices 12a-d. Other devices capable of accessing devices across an electronic network can access services of or data resident on the devices 12a-d in the cluster 10 through an interconnected network 14. In a typical example, the requests are made and transmitted to the cluster 10 using a network protocol, such as TCP/IP. Of course, networking protocol may occur on several levels, including the application, the presentation, the session, the transport, the network, the data link, and the physical layers. Of course, many network protocols and/or addressing schemes are available at these levels, and one skilled in the art will realize that any of these network protocols may be used in the practice of the invention without limitation to the reference above of any particular networking or addressing protocol.

Each of the network enabled devices 12a-d may be accessed through a single address, or through multiple addresses. In this case, assume that the cluster 10 represents a node of one address, wherein any of the devices 12a-d within the cluster 10 may be accessed through the single address. Accordingly, a routing device 16 is placed at the "entrance" to the cluster 10 to perform proper routing of messages and/or data to the appropriate device within the cluster 10. The routing device also performs appropriate routing of messages and/or data emanating from any of the devices 12a-d to other devices coupled to the interconnected network 14.

In the instance where a single address is used to identify any of the devices 12a-d within the cluster 10, an incoming message or data packet from the interconnected network 14 is received at the routing device 16. The routing device 16 can ascertain which of the devices 12a-d that the message or data is destined for. The routing device 16 may then relay the message to the appropriate device within the cluster 10.

Now assuming an outgoing message, the specific machine 12a-d in the cluster 10 directs the message and/or data to the routing device 16. Upon receiving the outgoing message and/or data, the routing device 16 determines the proper route to send the message based upon the information contained within it. Thus, for a particular circumstance, proper route may be chosen for the particular outgoing message and/or data, whether the routing metric that is used is based on time, money, hops, or transmission media. Accordingly, the routing device 16 functions as a routing device for the entire cluster 10, and not just for one of the devices 12a-d within the cluster 10. In this manner, a cohesive and timely manner for controlling the routing to and from the machines 12a-d within the cluster 10 may be performed.

Note that the devices 12a-d within the cluster 10 may be in a shared pool of resources, or that the devices 12a-d within the cluster 10 may represent a load balanced set of resources. In each case, the operation of the routing device 16 according to the invention operates on the same principle.

It should be noted that the devices 12a-d within the cluster 10 may be considered as any network-enabled device. These type of devices include servers, general purpose computing devices, kiosk-type devices, smart card enabled devices, wireless enabled devices, and the like. Those skilled in the art will realize that many other network devices are possible and can be used in conjunction with the inventive aspect. Additionally, while only four devices are shown, FIG. 1 should be construed as having any arbitrary number of network-enabled devices. Again, those skilled in that art will realize that any number of network devices may be used in conjunction with the inventive aspects of the presently claimed invention.

When new information regarding routing device connections and other metrics associated with the routing of messages within, to, and from various points in the interconnected network is made available, the routing device 16 can adjust its routing operation to allow for these changes. The routing device 16 contains a dynamic routing module 18. The dynamic routing module 18 receives the appropriate routing data for the devices coupled to the interconnected network 14. The dynamic routing module may then possibly recompute any metrics associated with any entries associated with such data. In turn, these actions can lead to a dynamic routing table, in which new data is received, new metrics may be computed, and the routing entries therein updated appropriately.

Additionally, the dynamic routing module 18 can respond to new routing devices that the routing device 16 is placed into contact with. In these cases, the dynamic routing module 18 can determine metrics associated with the new routing device, and place the information relating to that routing device and its associated paths in the routing tables for further use.

Typically, the dynamic routing module 18 is configured to run in a particular manner. Such portions of its operation may be selectable or optional. For example, if the dynamic routing module 18 is an instantiation of an OSPF package, such operational characteristics may be defined from a command line interface.

For example, configuration commands may be sent to the dynamic routing module 18 and used to set parameters for the network performance of the dynamic routing module 18. Additionally, the configuration commands may be used to perform numerous functions on the dynamic routing module 18 to delineate and refine the behavior of the dynamic routing module 18. For example, these commands may be used to: create or delete an OSPF area or stub area; to summarize routes at an area boundary; to add or remove an OSPF area's password protection; to enable or disable an OSPF interface; to assign a metric to an interface, to assign a dead interval (i.e., the time that the switch waits to receive a hello packet from a neighboring routing device before the switch declares the neighbor inoperable); to assign a hello time interval (i.e., the time that the switch waits before issuing another hello packet); to specify the priority level that the dynamic routing module 18 uses for an interface when determining a new designated routing device; to set a time between database entry announcements (i.e., link state announcement (LSA)), among many other commands. Those skilled in the art will realize that other configuration commands and settings may be employed to use the tune the performance of the routing device 16 operating the dynamic routing module 18. Further, those skilled in the art will realize that these other configuration settings may be employed in the scope of the invention.

Working in conjunction with the dynamic routing module 18 operating on the routing device 16 is a configuration manager module 20. The configuration manager module 20 stores state information relating to the operational state of the dynamic routing module 18. Additionally, the configuration manager module 20 also stores changes to the configuration of the dynamic routing module 18. Thus, when configuration requests are made to the dynamic routing module 18, the configuration manager module 20 stores the request or a representation of the operating characteristics of the dynamic routing module 18 after application of the configuration request.

In an embodiment of the invention, configuration settings applied to the dynamic routing module 18 operating on the routing device 16 are relayed to the configuration manager module 20. In this manner, configuration information for the dynamic routing module 18 that is operating on the routing device 16 may be stored through the action of the configuration manager module 20. In one implementation, the configuration requests are relayed to the configuration manager module 20, which stores the configuration request. In this embodiment the configuration manager module 20 relays the configuration request to the dynamic routing module 18 operating on the routing device 16.

In another embodiment, the configuration request is "forked". In this alternative embodiment, the configuration request is sent to both the dynamic routing module 18 operating on the routing device 16 and the configuration manager module 20. In yet another alternative embodiment, a messaging portion of the dynamic routing module 18 operating on the routing device 16 relays the configuration request to the configuration manager module 20.

When the dynamic routing module 18 operating on the routing device 16 receives a configuration request, the dynamic routing module 18 processes and applies the configuration request. Upon processing the configuration request, the dynamic routing module 18 may then alter its behavior or operational characteristics in the requested manner.

If the configuration request somehow fails, the dynamic routing module 18 can relay the failure condition to the configuration manager module 20. In this manner, a failed configuration request is not stored, since the command failed on the operational dynamic routing module 18. Or, in an alternative, the configuration manager module 20 may relay the configuration request to the dynamic routing module 18. Upon an indication that the configuration request was correctly applied, the configuration manager module 20 then applies the configuration request to the representation of the operational state of the dynamic routing module 18.

Further configuration requests may lead to other changes in the representation of the operating state of the dynamic routing module 18 as maintained by the configuration manager module 20. For example, assume that at some time after starting operation, a new dead time is requested for the dynamic routing module 18. In this manner, the configuration manager module 20 records the request for a new dead time. At a later time, assume that another dead time is requested. In this manner, the representation of the operational state maintained by the configuration manager module 20 can reflect this new dead time as the operational characteristic of the dynamic routing module 18. This type of configuration tracking may be performed for a wide variety of operational characteristics of the dynamic routing module 18 operating on the routing device 16.

The storage of the operational characteristics of the dynamic routing module 18 may be accomplished in a number of ways. A file may be maintained that contains fields relating to various operational characteristics and the application of configuration requests to the characteristics. Alternatively, a record of the configuration requests may be maintained, wherein configuration requests that alter previously executed configuration parameters are overwritten. Or, the configuration requests may be stored in the form of database entries. Those skilled in the art will realize that these methods, among others, can be used to store a representation of the operational state of the dynamic routing module 18 operating on the routing device 16.

During operation, the dynamic routing module 18 operating on the routing device 16 operates in a normal fashion. During this operation, the routing device 16 makes contact with an assortment of neighboring routing devices. Through this interaction, routing tables to other points available on the interconnected network are made available. As changes occur to the routing topology of the coupled network, or as metrics change within the network, the dynamic routing module 18 makes changes to its internal routing data to reflect these changes.

An alternative routing device 22 is also coupled to the routing device 16. During the course of operation, any changes to the routing information are propagated to the alternative routing device 22. The alternative routing device 22 may then store and update any routing information associated with the operation of the routing device 16 in conjunction with the traffic to and from the interconnected network 14. In this manner, the alternative routing device 22 maintains updated routing information in the operation of the system with respect to the other network devices associated with the interconnected network 14.

The changes to the routing information associated with the alternative routing device 22 may be accomplished in a variety of ways. In one aspect, the messages coming into the dynamic routing module 18 can be forked, with one path leading to the alternative routing device 22. In another aspect, the dynamic routing module 18 initiates the transfer of information during, before, or after application of the information to its own routing information storage. In any manner, a current or near-current operable copy of the routing information used to interact with other devices through the interconnected network 14 is stored on the alternative routing device 22. Thus, the information contained within or accessible to the alternative routing device 22 is a current representation of the state of the routing information used by the routing device 16 to communicate to other devices through the interconnected network 14.

Finally, assume that the routing device 16 or that the dynamic routing module 18 stops functioning. Typically, the other devices 12*a-d* connecting to the now non-functioning routing device 16 would cease to receive or send information from or to the interconnected network 14, respectively. Further, any other routing devices coupled to and in contact with the routing device 16 across the interconnected network that send or receive information from the routing device 16 would detect the non-functioning nature of the routing device 16. Typically, the other routing devices that send or receive data to or from the routing device 16 across the interconnected network 14, upon detecting that the routing device 16 was no longer operational, would rebuild their routing tables.

Typically, to rebuild a routing table entails contacting all the routing devices that a particular device knows about. This can also entail issuing a signal over the network to those other routing devices that may be coupled to the network, and listening for such messages from those other routing devices. Upon receiving the associated information, the routing tables can be rebuilt based upon the information that comes back to the routing device that is attempting to rebuild its tables. Thus, a failure condition for a routing device entails a substantial effort for the network routing devices, since they need to ensure synchronous information between them.

Further, when the routing device 16 comes back online, it has to undergo a synchronization process with the other routing devices coupled to it across the interconnected network 14. In this manner, both the coupled routing devices and the routing device 16 may have to undergo substantial expenditure of resources to deal with the change of the network topology due to the downtime, and subsequent uptime, of the routing device 16.

In an embodiment of the invention, the alternative routing device 22 coupled to the routing device 16 detects the failure condition and initiates a dynamic routing module 24. The alternative routing device 22 is also coupled to the devices 12*a-d* in the cluster 10. Upon instantiating the dynamic routing module 24, the alternative routing device 22 can serve as a backup routing device for the devices 12*a-d* in the cluster 10 using the routing information provided by the routing device 16 earlier in the operational cycle.

In one aspect, the alternative routing device 22 has a memory media on which is a viable copy of the dynamic routing module 24. Upon determining that the routing device 16 has encountered a situation wherein the routing device 16 cannot perform routing functions for the devices 12*a-d* in the cluster 10, the alternative routing device 22 loads the dynamic routing module 24 into memory, and executes the dynamic routing module 24.

Upon initiating the operation of the dynamic routing module 24, the alternative routing device 22 also determines if any configuration information should be made available to the dynamic routing module 24 and/or applied to the dynamic routing module 24. In one aspect, an alternative configuration manager module 26 is operational on the alternative routing device 22. The configuration manager module 26 has available the necessary information to operate the dynamic routing module 24 in the same configuration that the original dynamic routing module 18 in the routing device 16 was operating under at or near the time that the dynamic routing module 18 ceased functioning.

In one aspect, the information stored by configuration manager module 20 is relayed to the configuration manager module 26. Or, the information stored by the configuration manager module 20 is made available to the configuration manager module 26.

The alternative routing device 22 then applies the configuration information through the interaction of the configuration manager module 20 and the configuration manager module 26 to the instantiation of the dynamic routing module 24 now operating on the alternative routing device 22. Thus, the dynamic routing module 24 operating on the alternative routing device 22 can be configured at least approximately the same as that of the dynamic routing module 18 operating on the routing device 16 prior to it ceasing to function.

As the alternative dynamic routing module 24 operates in the alternative routing device 22, new configuration parameters may be implemented on the operation of the alternative routing module 24. Accordingly, the configuration manager module 26 operating in conjunction with the alternative routing device 22 can perform the same steps to save the new configuration state change. Thus, when the routing device 16 resumes operation, any new configuration changes in the control state of the alternative dynamic routing module 24 operating on the alternative routing device 22 may be applied to the original dynamic routing module 18 when it is restarted on the routing device 16.

In one implementation, the network routing protocol may implement a "hitless restart" feature. In this concept, the routing device 16 may initiate a graceful restart signal. This signal is relayed to one or more neighbors. The neighbors continue to advertise their relationship with the routing device 16 as if the routing device 16 had remained in continuous operation. This means that the neighbors continue to list an adjacency to the routing device 16 over a network segment, regardless of the adjacency's current synchronization state.

To further utilize this feature, the alternative routing device 22 may send the "hitless restart" message to appropriate routing devices across the network. In this manner, these other routing devices need not recalculate and rebroadcast the information to rebuild the various routing databases used in the network topology. In this manner, the alternative dynamic routing module 24 operating on the alternative routing device 22 may start its operation to directing traffic to and from the devices 12a-d in the cluster 10 without needless overhead impacting the remainder of the routing devices accessible across the interconnected network 14. Additionally, minimal impact is made with respect to the operation of the alternative routing device 22 as an alternative routing device. It should be noted that the mechanisms described in relation to the functionality described above may be used in terms of a planned cessation of the dynamic routing module 18, or in terms of an unplanned failure of the dynamic routing module 18.

Figure 2:
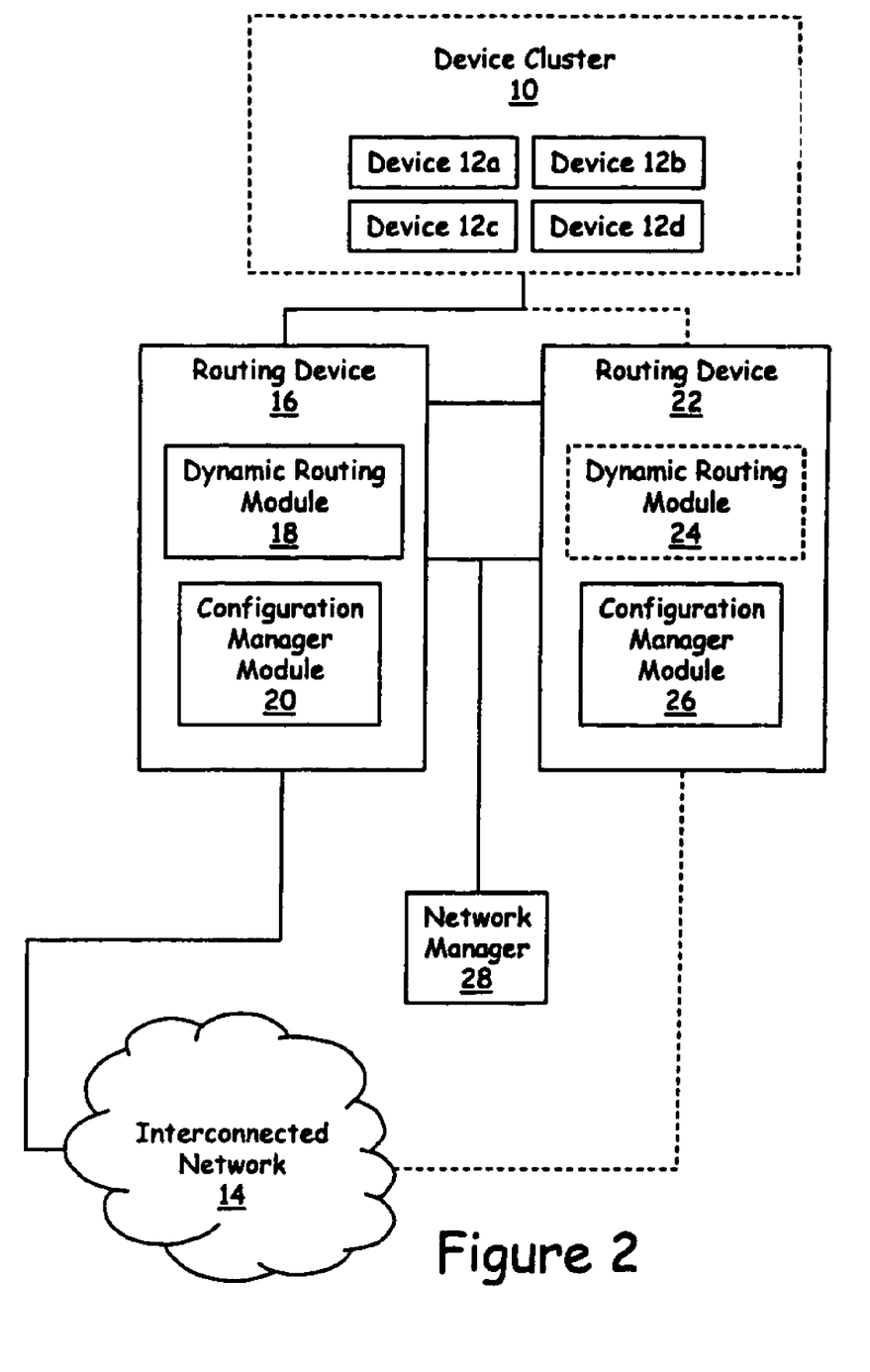
FIG. 2 is a schematic diagram of a controlled cessation of a cluster routing device in a planned restart scenario according to the invention.

FIG. 2 is a schematic diagram of a controlled cessation of a cluster routing device in a planned restart scenario according to the invention. In this aspect, a network manager 28 allowing additional control of the alternative routing device 22 and the routing device 16 is implemented. The network manager 28 can cause the routing device 16 to cease service, and the alternative routing device 22 to correspondingly start service to the devices 12a-d in the cluster 10.

At a particular time, the network manager 28 can issue a command to the routing device 16 to halt operation of the dynamic routing manager 18. The command may be in the form of an immediate cessation, or to take effect at some predetermined point in time in the future. The predetermined point in time may be a certain point in the future (i.e., Feb. 17, at 6:02 p.m.), an offset (i.e., 20 min. from the command), upon the occurrence of an event (i.e., when an application in a network device fails), or upon an offset to such an occurrence (i.e., 30 secs. after network traffic goes below a predetermined amount.) Concurrently, the network manager 28 can issue a corresponding command to the alternative routing device 22 to start the alternative dynamic routing module 24 at a time corresponding to the cessation of operation of the dynamic routing manager 18.

A hitless restart may also be initiated to any adjacent routing devices across the interconnected network 14 at a corresponding time. The hitless restart may be sent or initiated by the dynamic routing module 18, the alternative dynamic routing module 24, or the network manager 28.

Upon the cessation of operation of the dynamic routing module 18, the alternative routing device 22 can start the operation of alternative dynamic routing module 24 operation in a near seamless transition. In this manner, the routing device 16 may be serviced or upgraded upon a specific occurrence or at a specific point in time.

Further, the transition of operation from the routing device 16 to the alternative routing device 22 relative to the other routing devices across the interconnected network 14 may be accomplished with a near-seamless operation in network traffic flowing to and from the cluster 10. This is due to the characteristic that the neighboring routing devices may be aware that some event is occurring, but that the specific event may not necessarily impact the network topology relative to the current information that they have. Also, a transition in the network service of the devices 12a-d in the cluster 10 is accomplished without a resource-consuming rebuild or retransmission of the information relating to the network information on the alternative routing device 22.

In terms of the network manager 28, this may be used to allow an even further seamless transition between the dynamic routing module 18 and the alternative dynamic routing module 24. The network manager 28 may be used to effectuate a "last-second" transition of information that could be used by the alternative dynamic routing module 24 from the dynamic routing module 18. In this manner, the transition between the dynamic routing module 18 and the alternative dynamic routing module 24 is as up to date as possible.

Figure 3:
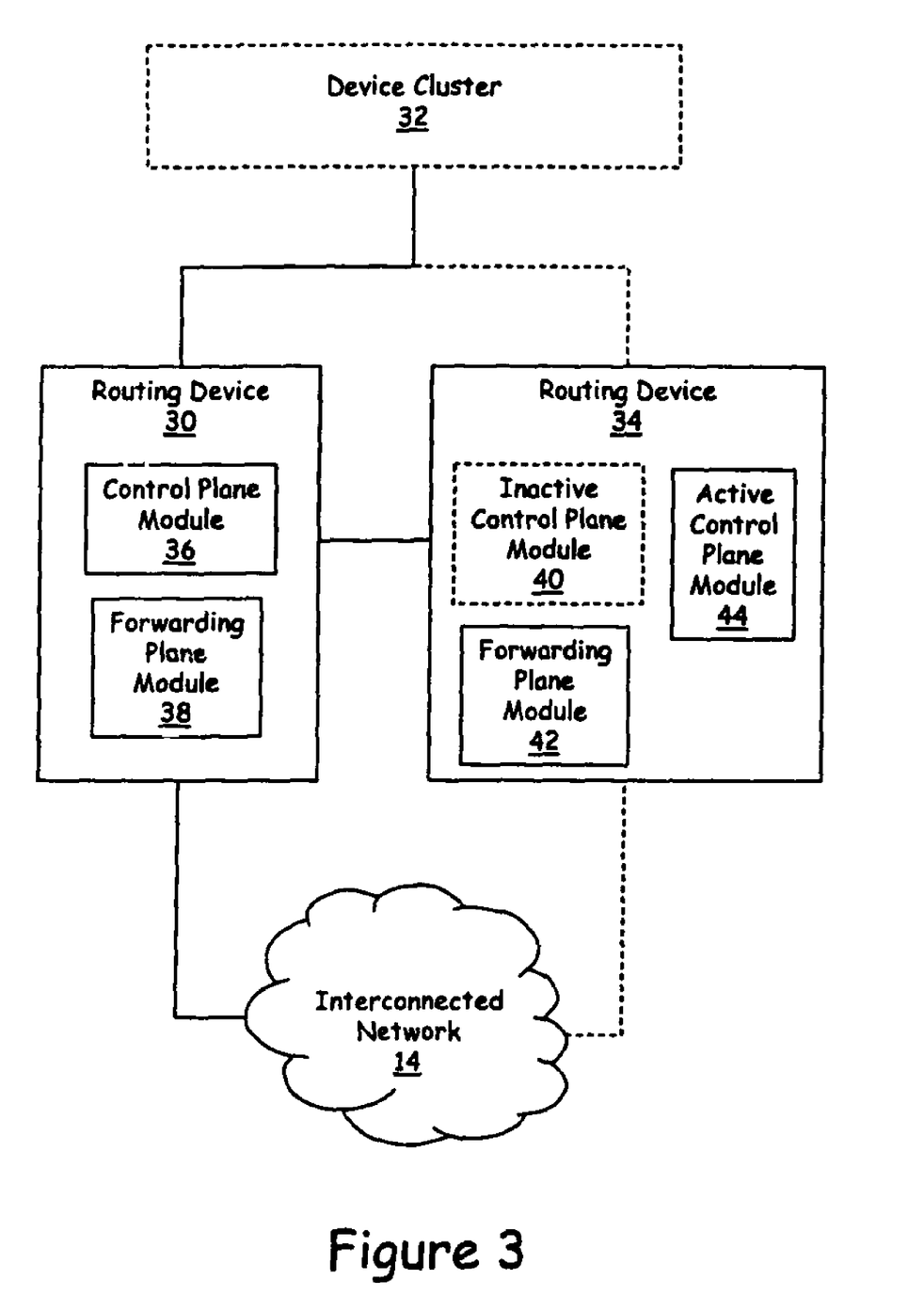
FIG. 3 is a logical-plane view of the redundant data transmission device according to the invention.

FIG. 3 is a logical-plane view of the redundant data transmission device according to the invention. In most instances, the work of a routing device may be divided into a control plane and a forwarding plane. The control plane includes node-related control and management functions, whereas the forwarding plane does the per-packet processing of packets passing through the node. Examples of control-plane applications are routing protocols, such as OSPF, and management protocols such as SNMP.

In particular, a routing device 30 is shown performing the routing functions associated with a cluster 32. An alternative routing device 34 is coupled both to the routing device 30 and the cluster 32. The routing device 30 is differentiated between a control plane module 36 and a forwarding plane module 38. The alternative routing device 34 has control plane modules and a forwarding plane module 42, as well. The alternative routing device 34 can have both an active control plane module 44 and an inactive control plane module 40.

During operation, the routing device 30 forwards information relating to the network characteristics of the forwarding plane module 38 to the alternative routing device 34, which in turn, communicates the network information to the forwarding plane module 42. Accordingly, a closely updated, if not fully updated, copy of the information relating to the forwarding plane associated with the routing device 30 is maintained separately from the routing device 30.

Further, information regarding the control plane module 36 is relayed to the alternative routing device 34. The alternative routing device 34, or possibly another remote device, can maintain the control plane information relating to the operational characteristics of the control plane module 36 on the routing device 30. To save overhead, the control plane module 40 of the alternative routing device 34 can be maintained in an inactive state, such as residing on the alternative routing device 34 on a hard drive, but not loaded into memory for execution.

Of course, either of the active control plane module 44 or the inactive control plane module 40 may be made up of several executable modules. In the alternative routing device 34, none, some, or all of the control plane modules may be executing at the time of the failover event. Accordingly, at the failover event, whether planned or unplanned, the remaining modules that comprise a fully functional control plane can be executed in the alternative routing device 34.

Figure 4:
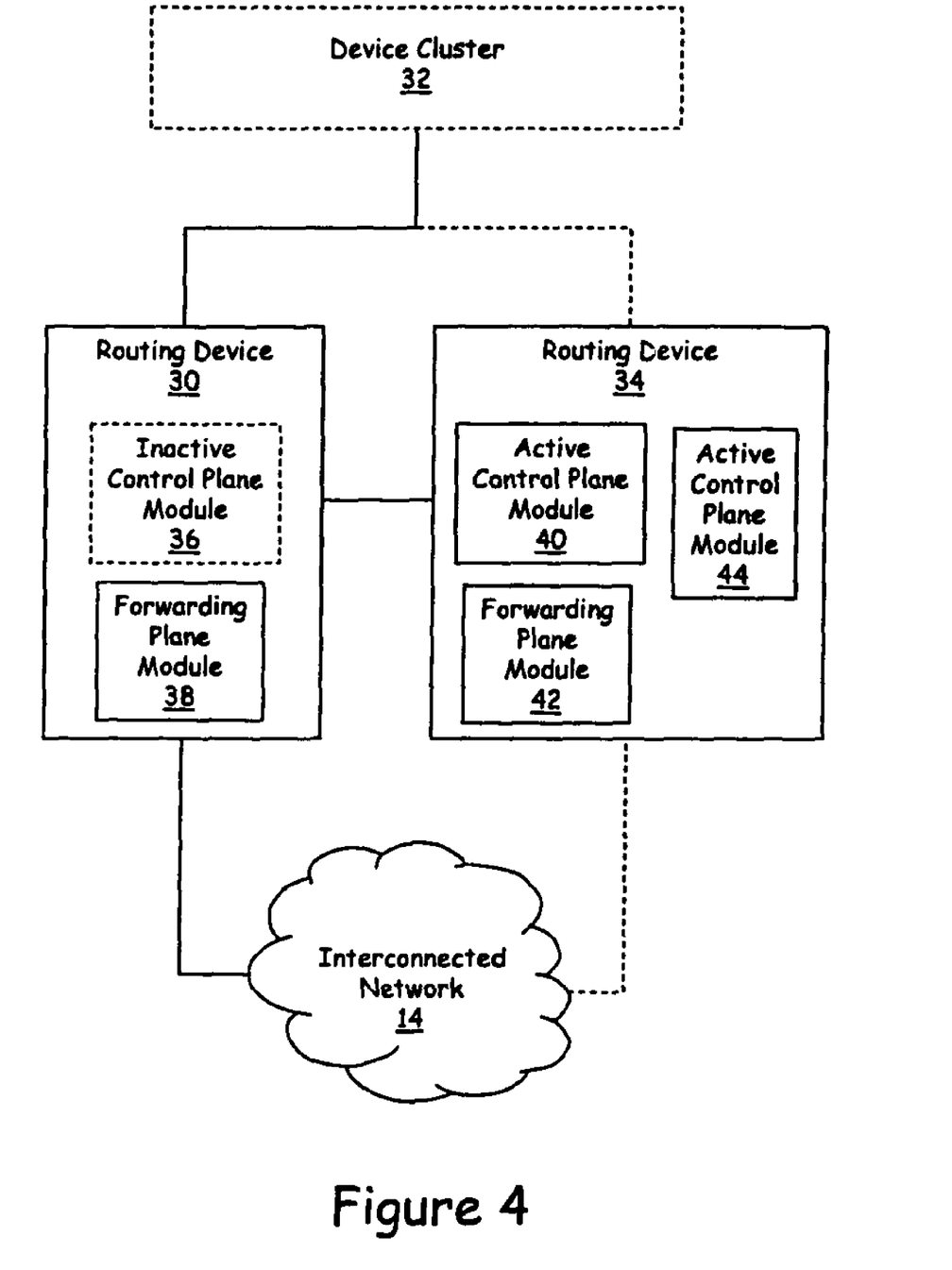
FIG. 4 is a block diagram detailing the effect of a failover event on the components of FIG. 3 in accordance with the invention.

FIG. 4 is a block diagram detailing the effect of a failover event on the components of FIG. 3 in accordance with the invention. Upon the situation in which the control plane module 36 on the routing device 30 is deemed to be inactive, which can be voluntary or not, as described earlier, the alternative routing device 34 can initiate execution of the control plane module 40. The control plane configuration information is read and relayed to the now-executing control plane module 40, which then can operate in an as near similar fashion as possible to the operational characteristics of the now-inactive control plane module 36.

Additionally, the forwarding plane module 42 contains the forwarding information for the alternative routing device 34. In this manner, the forwarding plane may also operate in an as near similar manner of operation of the routing device 30 as possible when the routing device 30 is not functioning.

Further, the routing device 30 may signal to other routing devices across the interconnected network 14 that a node associated with the routing device 30 is undergoing a hitless restart. Or, the alternative routing device 34 may signal such a hitless restart, or another associated overall control module existing on another device may perform such an operation. In these cases, any adjacent routing devices accessible across the interconnected network 14 can continue to operate in a manner that allows them to possibly dispense with the necessity of a recomputation or redissemination of routing information.

Figure 5:
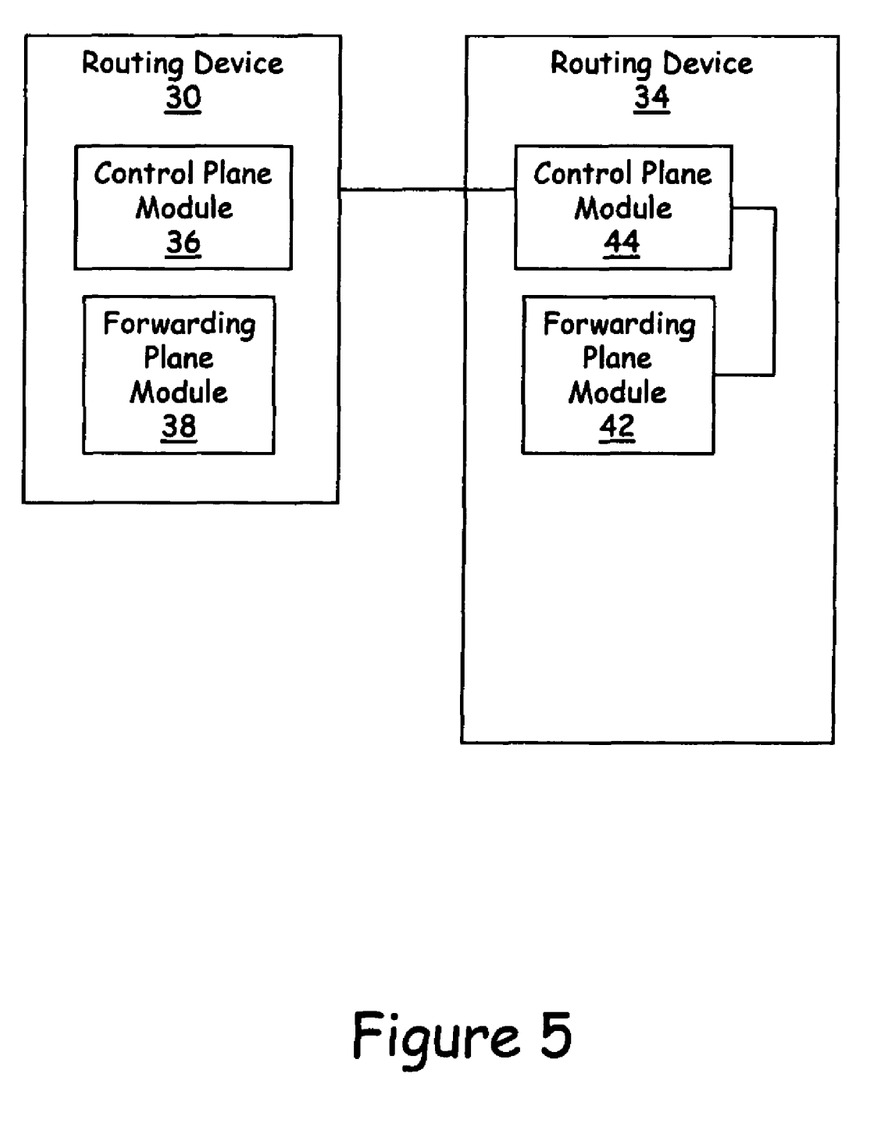
FIG. 5 is a block diagram detailing a possible communication path relaying forwarding plane information in accordance with the invention.

FIG. 5 is a block diagram detailing a possible communication path relaying forwarding plane information in accordance with the invention. In this setup, the routing device 30 is coupled to the control plane module 44 operating on the alternative routing device 34. The control plane module 44 can then relay forwarding plane information from the routing device 30 to the forwarding plane module 42.

Figure 6:
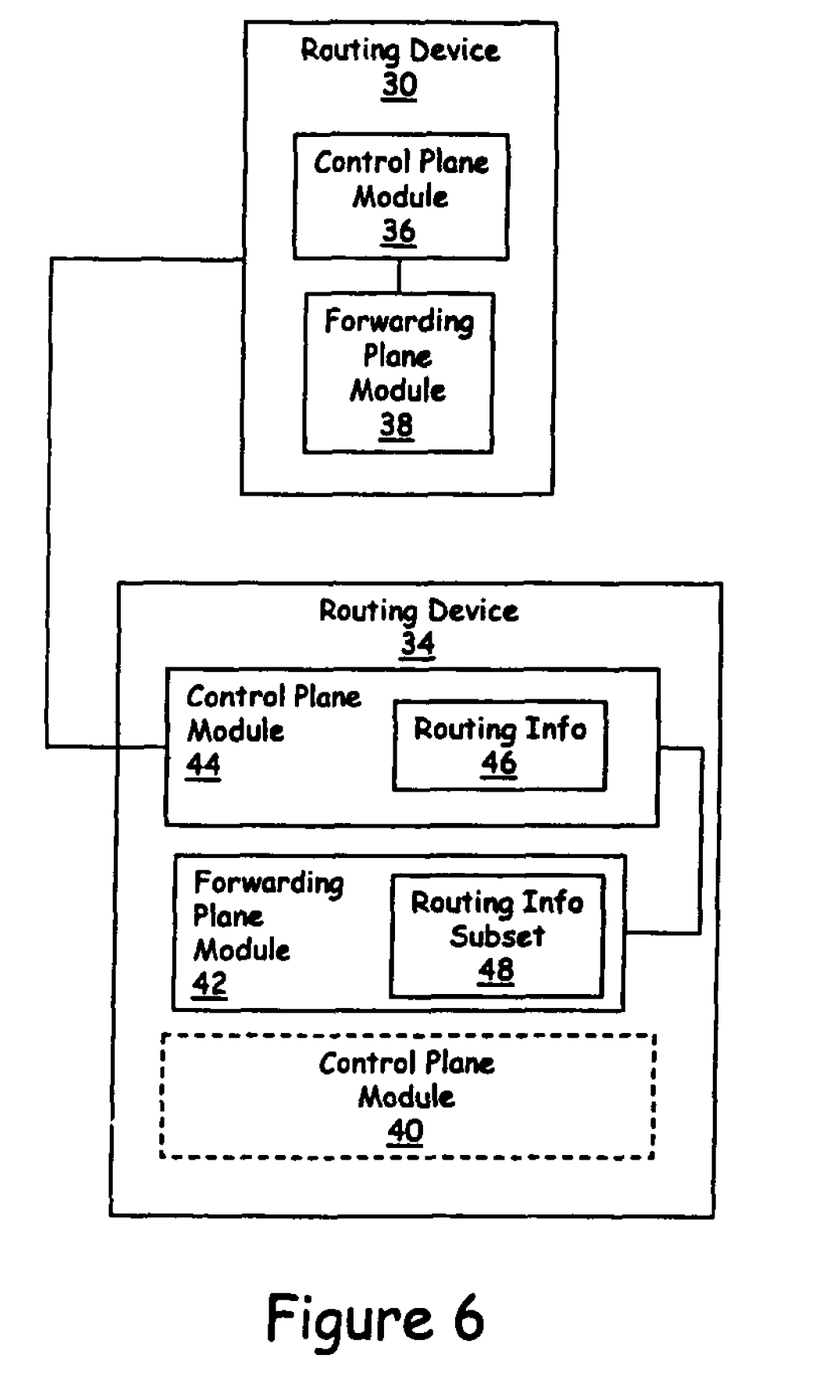
FIGS. 6 and 7 are detailed block diagram detailing a possible communication path relaying forwarding plane information in accordance with the invention.
Figure 7:
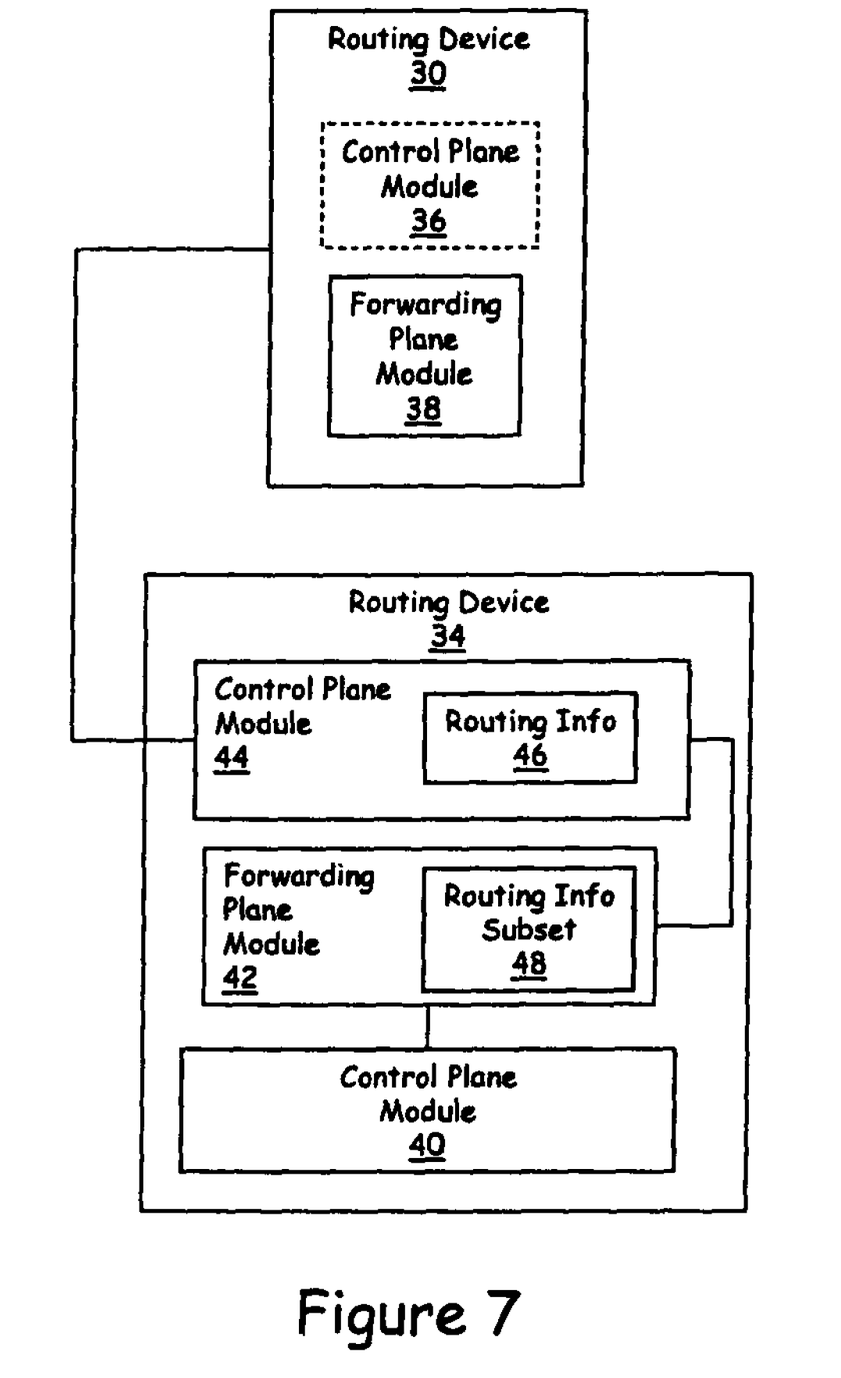

FIGS. 6 and 7 are detailed block diagrams detailing a possible communication path relaying forwarding plane information in accordance with the invention. In this setup, the routing device 30 is coupled to the control plane module 44 operating on the alternative routing device 34. The control plane module 44 can then store a set of routing information 46. The control plane module can then relay a subset of the information from the routing device 30 to the forwarding plane module 42, which can then store such a subset of routing information 48. Certain portions of the control plane modules, like the dynamic routing module, can remain inactive, as shown in a control plane module 40.

In FIG. 7, a failover event has occurred. As stated before, this failover event can be planned or unplanned. In this case, the alternative routing device 34 can initiate those previously unexecuting control plane modules 40. In this case, the routing information 46 may be used by the control plane module 40. Furthermore, the previously unexecuting control plane module 40 can initiate contact with the forwarding plane module 42, and interact with the forwarding plane module 42 to provide routing functionality previously provided by the routing device 30 through the control plane module 36.

Figure 8:
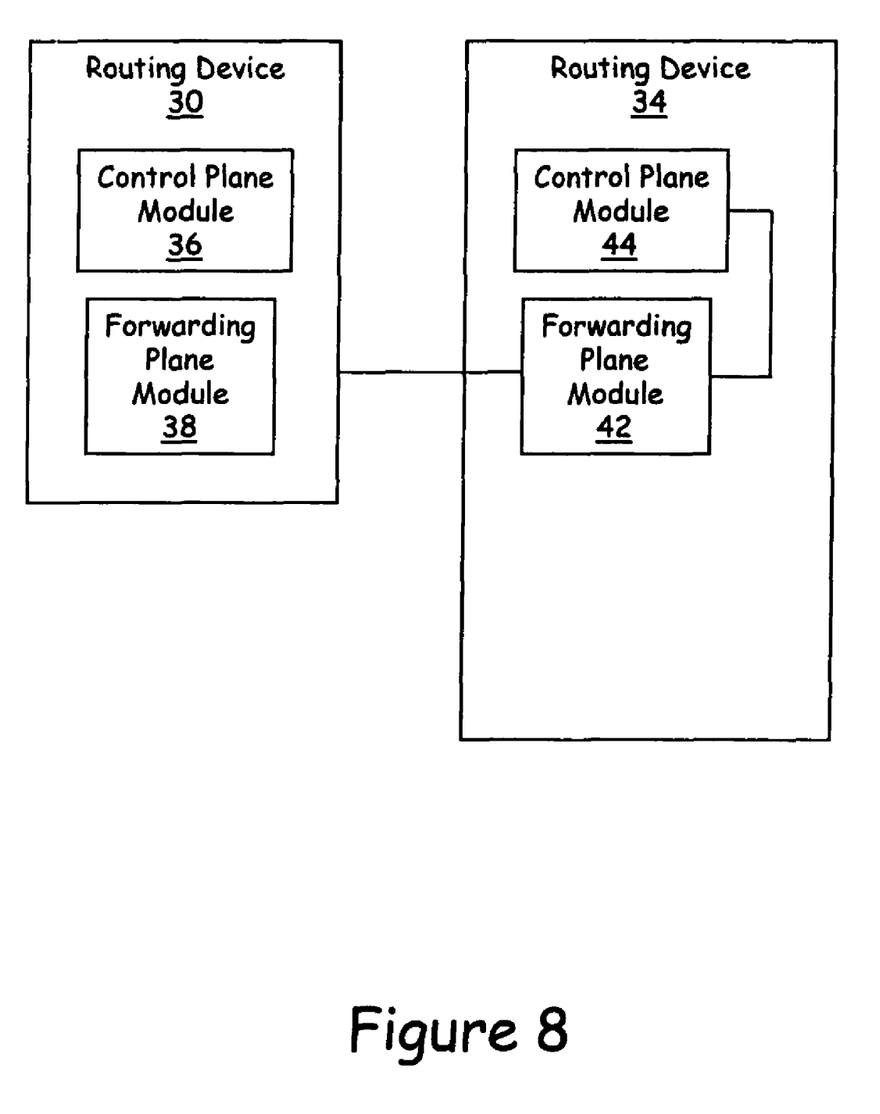
FIG. 8 is a block diagram detailing a possible communication path relaying forwarding plane information in accordance with one embodiment of the invention.

FIG. 8 is a block diagram detailing a possible communication path relaying forwarding plane information in accordance with one embodiment of the invention. In this setup, the routing device 30 is coupled to the forwarding plane module 42 operating on the alternative routing device 34. The forwarding plane module 42 can then relay certain or all forwarding plane information from the routing device 30 to the control plane module 44.

Figure 9:
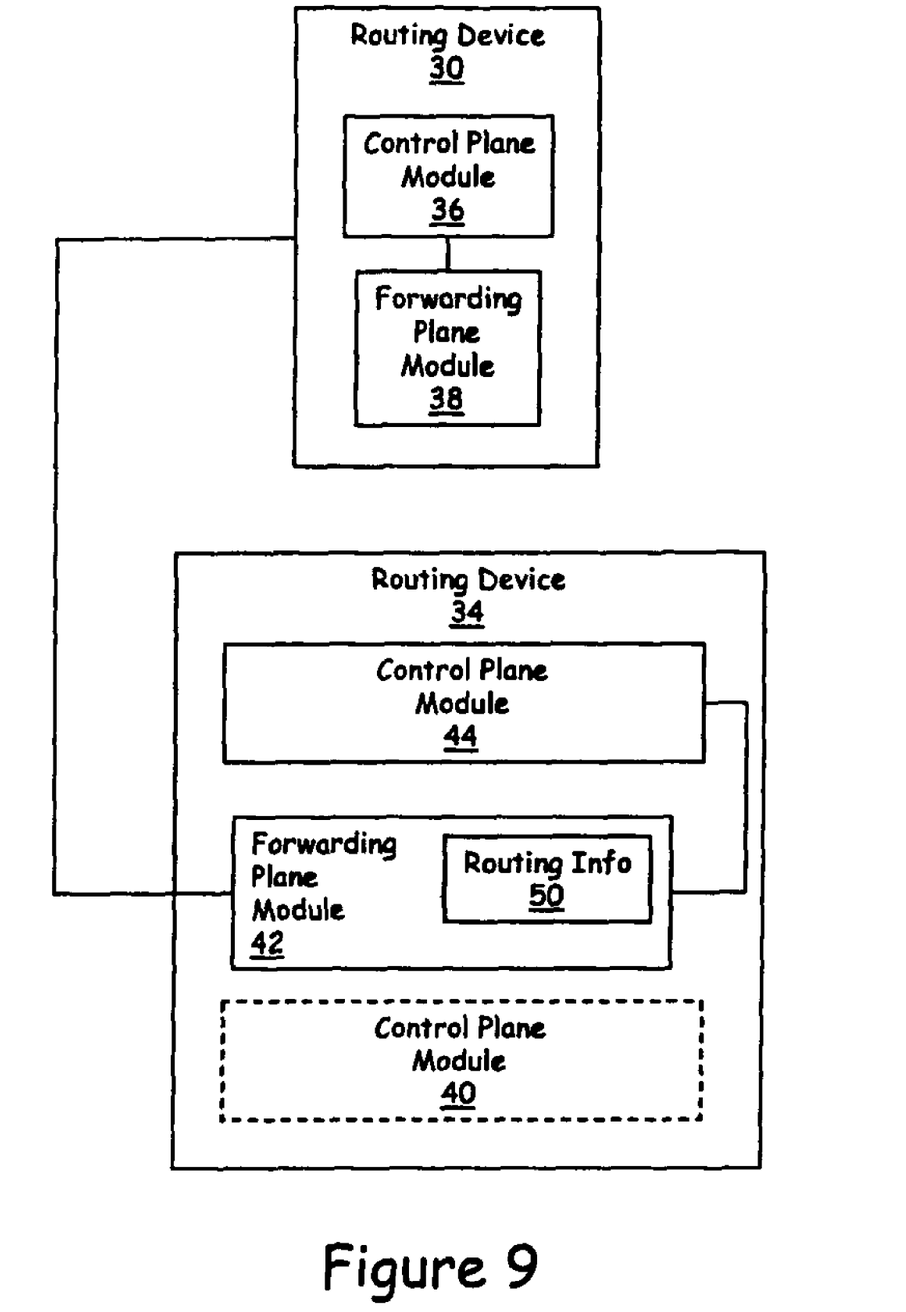
FIGS. 9 and 10 are detailed block diagrams detailing a possible communication path relaying forwarding plane information in accordance with the invention.
Figure 10:
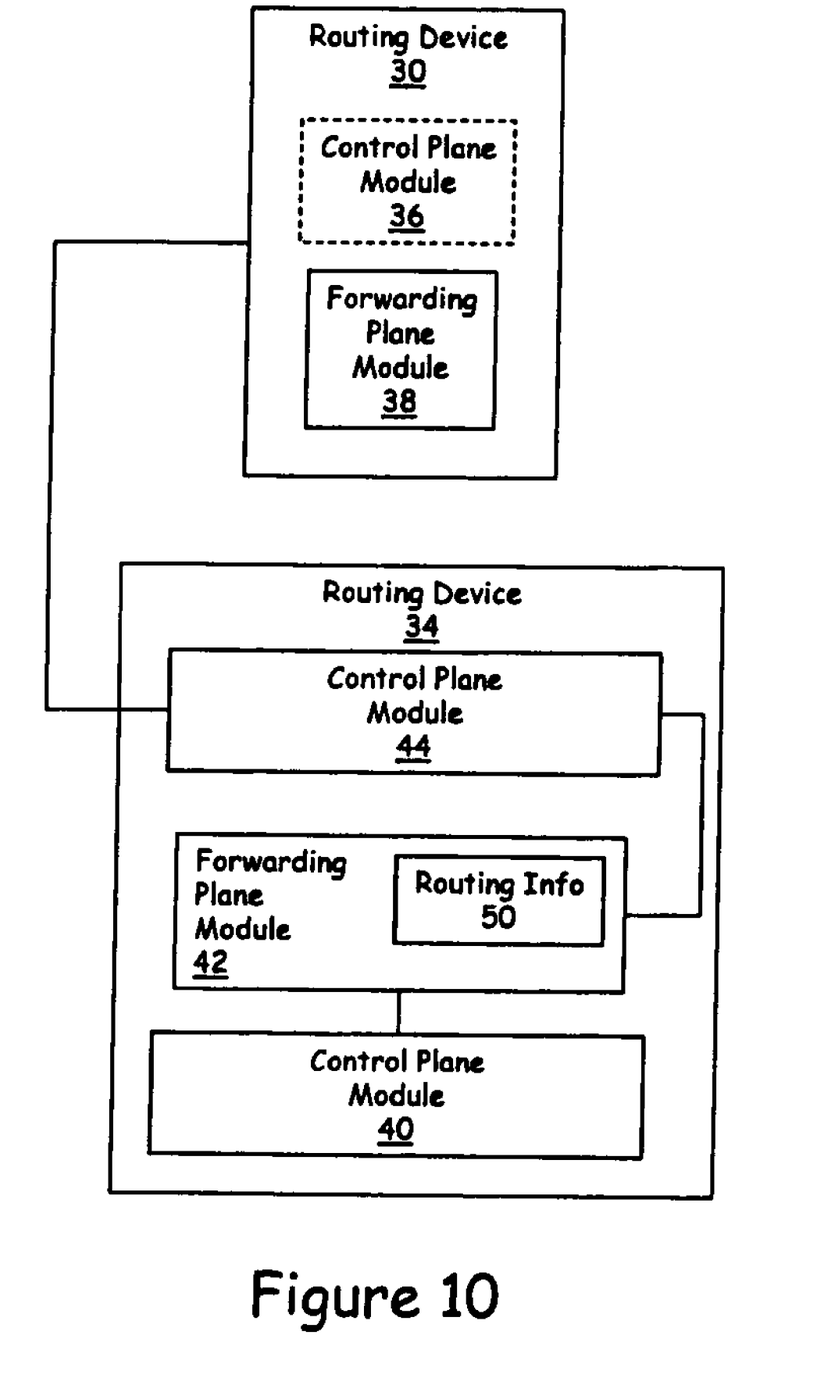

FIGS. 9 and 10 are detailed block diagrams detailing a possible communication path relaying forwarding plane information in accordance with the invention. In this setup, the routing device 30 is coupled to the forwarding plane module 42 operating on the alternative routing device 34. The forwarding plane module 42 can then store a set of routing information 50. The forwarding plane module 42 can then relay all or a subset of the routing information from the routing device 30 to the control plane module 44. The control plane module 44 can then then store any such routing information coming from the routing device 30. Again, certain portions of the control plane modules, like the dynamic routing module, can remain inactive, as shown in a control plane module 40.

In FIG. 10, a failover event has occurred. As stated before, this failover event can be planned or unplanned. In this case, the alternative routing device 34 can initiate those previously unexecuting control plane modules 40. In this case, the routing information 50 may be used by the control plane module 40, or the control plane module may access any routing information stored in conjunction with the operation of control plane module 44. Again, the previously unexecuting control plane module 40 can initiate contact with the forwarding plane module 42, and interact with the forwarding plane module 42 to provide routing functionality previously provided by the routing device 30 through the control plane module 36.

Figure 11:
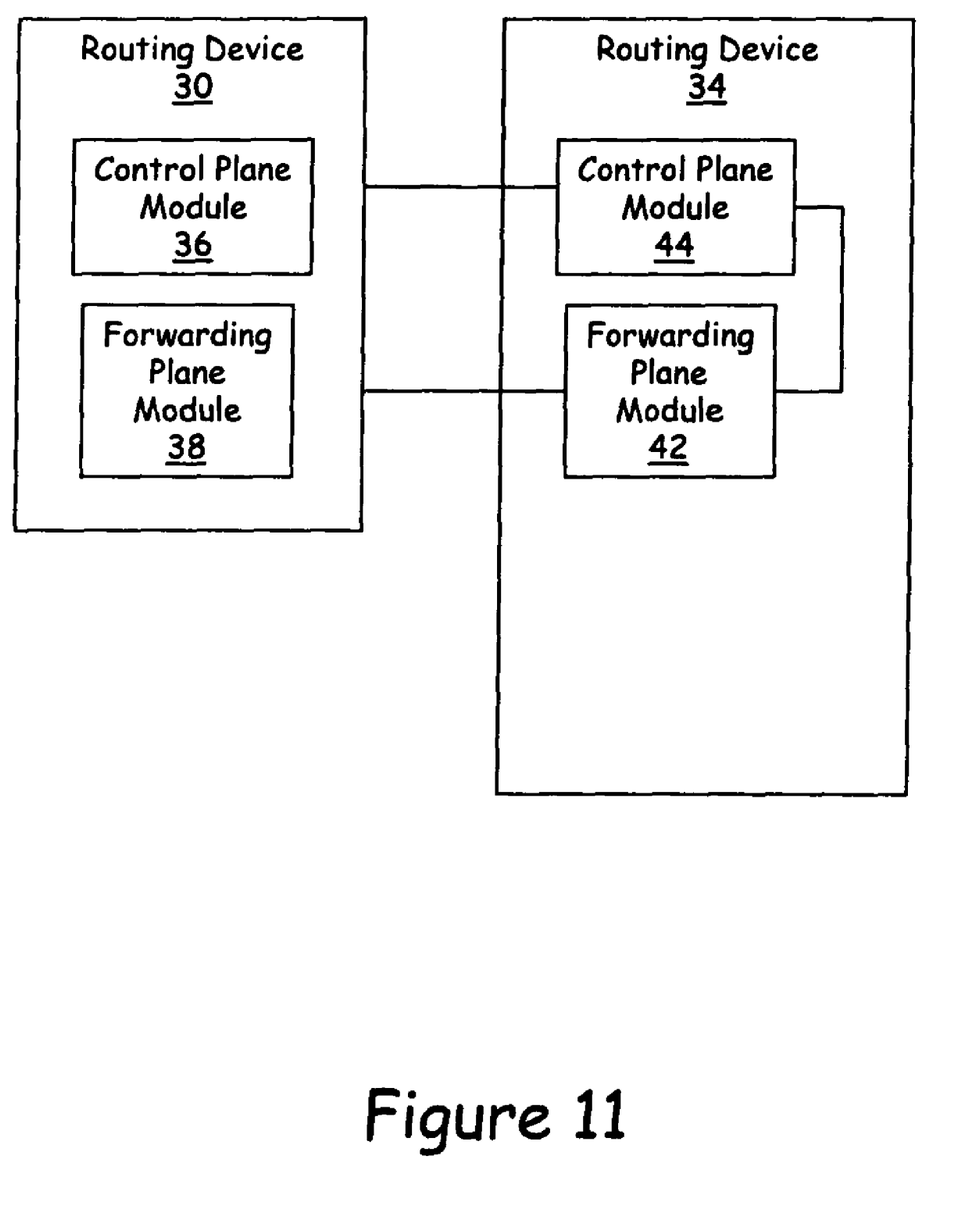
FIG. 11 is a block diagram detailing a possible communication path relaying forwarding plane information in accordance with one embodiment of the invention.

FIG. 11 is a block diagram detailing a possible communication path relaying forwarding plane information in accordance with one embodiment of the invention. In this setup, the routing device 30 is coupled to the forwarding plane module 42 and the control plane module 44 operating on the alternative routing device 34. The forwarding plane module 42 can then relay certain or all forwarding plane information from the routing device 30 to the control plane module 44, or vice versa. The mechanics of any planned or unplanned failover event may operate in a manner similar to that described previously in this disclosure.

Additionally, those skilled in the art will realize that other dynamically configurable and operable routing systems are used in various forums. Those skilled in the art will realize that the disclosure is not limited to OSPF, but includes those other dynamically configurable routing systems as well. In this vein, the hitless restart for OSPF to signal the network to continue forwarding packets to the cluster may not be required (or available) for other types of protocols. Additionally, the secondary function of the hitless restart (i.e., the functionality inhibiting the rebuild of the internal data representation of the network due to the failure of a single component) may also be implemented in current or future routing modules, or in extensions to other dynamic routing modules. Other equivalent functional features might be available in such other routing protocols to perform an equivalent operation in, or may contain this type of feature in future enhancements to such protocols.

The invention may be embodied on any computing device or software that runs on a computer. It may be embodied in any combination of software or hardware, including running instructions from any computer readable medium. Additionally, the topologies of the network may be expanded from the 1 routing device: 1 alternative routing device to any ratio. Further, the routing device mentioned may operate on a stand-alone basis, or may work on a device associated with another application.

Thus, a method and apparatus for providing redundant routing capabilities for a network node is described and illustrated. Those skilled in the art will recognize that many modifications and variations of the present invention are possible without departing from the invention. Of course, the various features depicted in each of the Figures and the accompanying text may be combined together. Accordingly; it should be clearly understood that the present invention is not intended to be limited by the particular features specifically described and illustrated in the drawings, but the concept of the present invention is to be measured by the scope of the appended claims. It should be understood that various changes, substitutions, and alterations could be made hereto without departing from the spirit and scope of the invention as described by the appended claims that follow.

What is claimed is:

1. A first routing component configured for use in a cluster of network enabled devices having at least a first network enabled device with the first routing component and a second network enabled device with a second routing component and a network manager, the network manager external to and communicably coupled to the first routing component and to the second routing component, each of the network enabled devices in the cluster configured to communicate with network devices external to the cluster through a single network address, each of the network enabled devices in the cluster configured to operate in parallel and independently of each other,
the first routing component comprising:
a first memory;
a first configuration manager module;
a first dynamic routing module; and
a first one or more processors,
the second routing component comprising:
a second memory;
a second configuration manager module;
a second dynamic routing module; and
a second one or more processors,
the first one or more processors configured to, by the first configuration manager module, store configuration information relayed from the second configuration manager module, the configuration information associated with operational characteristics of the second dynamic routing module;
the first one or more processors further configured to, by the first routing component, apply the configuration information through the interaction of the first configuration manager module and the second configuration manager module to an instantiation of a dynamic routing module operating in the first routing component;
the first one or more processors further configured to, by the first dynamic routing module, execute in response to a command from the network manager, and further configured to execute according to the configuration information stored in the first configuration manager module upon an unplanned failure of the second dynamic routing module;
the first one or more processors further configured to transmit a hitless restart event responsive to the unplanned failure of the second dynamic routing module, the hitless restart event signaling network enabled devices external to the cluster to continue forwarding packets to the cluster; and
the first one or more processors further configured to, by a communication module of the first routing component, receive a reply from another routing component associated with the receipt of a hitless restart.

2. The routing component of claim 1 wherein the dynamic routing module implements an OSPF routing protocol.

3. An apparatus for routing network traffic flowing to and from a cluster of network enabled devices having at least a first network enabled device with a first routing component and a second network enabled device with a second routing component and a network manager, the network manager external to and communicably coupled to the first routing component and the second routing component, each of the network enabled devices in the cluster configured to communicate with network devices external to the cluster through a single network address, each of the network enabled devices in the cluster configured to operate in parallel and independently of each other, the apparatus comprising:
means for, at the second network enabled device, receiving one or more incoming messages indicating the single network address as a destination address;
means for, at the second network enabled device, routing the one or more incoming messages to one of the network enabled devices in the cluster;
means for, at a configuration manager module of the first routing component, storing configuration information relayed from a configuration manager module of the second routing component; and
means for, at a dynamic routing module of the first routing component, in response to a command from the network manager, storing routing information received from the second routing component via a cluster internal communication mechanism;
wherein upon an unplanned failure of the second dynamic routing module of the second routing component,
the dynamic routing module of the first routing component executes according to the configuration information stored in the configuration manager module of the first routing component; and
the first routing component transmits a hitless restart event, the hitless restart event signaling network enabled devices outside of the cluster to continue forwarding packets to the cluster.

* * * * *